United States Patent
Takoshima et al.

(10) Patent No.: US 11,182,834 B2
(45) Date of Patent: Nov. 23, 2021

(54) PLATOON TRAVEL SYSTEM

(71) Applicant: DENSO CORPORATION, Kariya (JP)

(72) Inventors: Akiyuki Takoshima, Kariya (JP); Yuki Mae, Kariya (JP)

(73) Assignee: DENSO CORPORATION, Kariya (JP)

( * ) Notice: Subject to any disclaimer, the term of this patent is extended or adjusted under 35 U.S.C. 154(b) by 613 days.

(21) Appl. No.: 16/190,891

(22) Filed: Nov. 14, 2018

(65) Prior Publication Data

US 2019/0080373 A1    Mar. 14, 2019

Related U.S. Application Data

(63) Continuation of application No. PCT/JP2017/020090, filed on May 30, 2017.

(30) Foreign Application Priority Data

May 30, 2016    (JP) .............................. JP2016-107633

(51) Int. Cl.
  *G08G 1/00* (2006.01)
  *G06Q 30/02* (2012.01)
  (Continued)

(52) U.S. Cl.
  CPC ....... *G06Q 30/0283* (2013.01); *G05D 1/0088* (2013.01); *G05D 1/0217* (2013.01);
  (Continued)

(58) Field of Classification Search
  CPC ............. G06Q 30/0283; G05D 1/0088; G05D 1/0217; G08G 1/22; G08G 1/00
  (Continued)

(56) References Cited

U.S. PATENT DOCUMENTS

2010/0256835 A1    10/2010 Mudalige
2013/0041576 A1    2/2013 Switkes et al.
(Continued)

FOREIGN PATENT DOCUMENTS

DE    102017112279 A1 * 12/2017 .......... G08G 1/0129
JP    2004-094780 A    3/2004

OTHER PUBLICATIONS

K. Liang, J. Mårtensson and K. H. Johansson, "Heavy-Duty Vehicle Platoon Formation for Fuel Efficiency," in IEEE Transactions on Intelligent Transportation Systems, vol. 17, No. 4, pp. 1051-1061, Apr. 2016, doi: 10.1109/TITS.2015.2492243. https://ieeexplore.ieee.org/abstract/document/7314925 (Year: 2015).*
(Continued)

*Primary Examiner* — George Chen
*Assistant Examiner* — Lisa Ma
(74) *Attorney, Agent, or Firm* — Posz Law Group, PLC

(57) ABSTRACT

A platoon travel system includes an extraction portion, an arrangement order determination portion, a schedule notification portion, a contribution degree calculation portion, and a charge portion. The contribution degree calculation portion calculates a contribution degree for each of the plurality of target vehicles using loss-gain information. The contribution degree is calculated with respect to a benefit of all of the plurality of target vehicles obtained by performing the platoon travel. The loss-gain information reflects the benefit obtained when the plurality of target vehicles participate in the platoon travel. The charge portion determines a charge amount for each of the plurality of target vehicles based on the contribution degree calculated by the contribution degree calculation portion when the platoon travel is performed based on the platoon information. The charge amount is determined for each of the plurality of target vehicles to fairly obtain an advantage.

8 Claims, 5 Drawing Sheets

(51) Int. Cl.
 G06Q 10/08 (2012.01)
 G06Q 10/04 (2012.01)
 G05D 1/00 (2006.01)
 G05D 1/02 (2020.01)
 G06Q 50/30 (2012.01)

(52) U.S. Cl.
 CPC ........... *G05D 1/0295* (2013.01); *G06Q 10/04* (2013.01); *G06Q 10/08* (2013.01); *G06Q 50/30* (2013.01); *G08G 1/00* (2013.01); *G08G 1/22* (2013.01); *G05D 2201/0213* (2013.01)

(58) Field of Classification Search
 USPC ........................................................ 705/400
 See application file for complete search history.

(56) References Cited

U.S. PATENT DOCUMENTS

2016/0054735 A1* 2/2016 Switkes .................. H04W 4/44
 701/23
2016/0054736 A1* 2/2016 Kolhouse ........... G01C 21/3469
 701/96
2021/0182997 A1* 6/2021 Klingemann .......... G06Q 50/28

OTHER PUBLICATIONS

Hoef Sebastian van de et al: "Coordinating Truck Platooning by Clustering Pairwise Fuel-Optimal Plans", 2015 IEEE 18th International Conference on Intelligent Transportation Systems, IEEE, Sep. 15, 2015 (Sep. 15, 2015), pp. 408-415, XP032804034, DOI: 10.1109/ITSC.2015.75.

Alam A A et al: "An experimental study on the fuel reduction potential of heavy duty vehicle platooning" Intelligent Transportation Systems (ITSC), 2010 13th International IEEE Conference on, IEEE, Piscataway, NJ, USA, Sep. 19, 2010 (Sep. 19, 2010), pp. 306-311, XP031792599, ISBN: 978-1-4244-7657-2.

Yoshio Kamijo et al: "Whose deletion does not affect your payoff? The difference between the Shapley value, the egalitarian value, the solidarity value, and the Banzhaf value", European Journal of Operational Research, Elsevier, Amsterdam, NL, vol. 216, No. 3, Aug. 10, 2011, pp. 638-646, XP028309242, ISSN: 0377-2217, DOI: 10.1016/J.EJOR.2011.08.011.

* cited by examiner

PLATOON TRAVEL SYSTEM

CROSS REFERENCE TO RELATED APPLICATION

The present application is a continuation application of International Patent Application No. PCT/JP2017/020090 filed on May 30, 2017, which designated the U.S. and claims the benefit of priority from Japanese Patent Application No. 2016-107633 filed on May 30, 2016. The entire disclosures of all of the above applications are incorporated herein by reference.

TECHNICAL FIELD

The present disclosure relates to a platoon travel system that causes multiple vehicles having an automated driving function to perform a platoon travel.

BACKGROUND ART

A platoon travel in which vehicles capable of automated driving form a group and travel together is known.

SUMMARY

The present disclosure provides a platoon travel system that maximizes a benefit of entire platoon and fairly distributes the benefit to all vehicles participating in the platoon.

In the present disclosure, a platoon travel system is provided. The platoon travel system calculates a contribution degree for each of a plurality of target vehicles using loss-gain information. The contribution degree is calculated with respect to a benefit of all of the plurality of target vehicles obtained by performing a platoon travel, and the loss-gain information reflects the benefit obtained when the plurality of target vehicles participate in the platoon travel. The platoon travel system determines a charge amount for each of the plurality of target vehicles based on the contribution degree calculated by the contribution degree calculation portion when the platoon travel is performed based on the platoon information. The platoon travel system is determined for each of the plurality of target vehicles to fairly obtain an advantage.

BRIEF DESCRIPTION OF DRAWINGS

The above and other objects, features and advantages of the present invention will become more apparent from the following detailed description made with reference to the accompanying drawings. In the drawings.

DETAILED DESCRIPTION

A platoon travel in which vehicles capable of automated driving form a group and travel together is known. In the platoon travel, a leading vehicle is defined as a service provider and a following vehicle is defined as service user. A technique for distributing benefit between the service provider and the service user has been proposed. In the technique, the service user pays remuneration to the service provider. In addition, it has been also proposed that the remuneration is appropriately determined based on a time period of performing the platoon travel, a distance of performing the platoon travel, a travel environment such as a weather condition or a road surface condition, or a road condition such as a road type or a position.

The inventor has studied that the benefit of the vehicle obtained by participating in the platoon travel is not only reduction of a driving load for the service user, but also improvement of fuel economy. In consideration of the improvement of the fuel economy, the leading vehicle is capable of obtaining the benefit and the benefit is determined based on characteristics of each of the vehicles and an arrangement order in a platoon. That is, there is a difficulty in being felt by the participants in the platoon travel that the benefit is fairly distributed and a difficulty in maximizing the benefit for the entire platoon when a method in which only the leading vehicle is defined as the service provider is employed. In addition, with the above-described method, there is a difficulty in giving a motivation for participating in the platoon travel to a driver.

In the platoon travel system of the present disclosure, regardless of the arrangement order of the vehicles participating in the platoon travel, the configuration can fairly distribute the benefit to each of the vehicles. As a result, the configuration can motivate the drivers to participate in the platoon travel. In addition, the configuration can set the arrangement order that maximizes the entire benefit without giving a feeling of unfairness to the driver of each of the vehicles.

Hereinafter, embodiments for implementing the present disclosure will be described with reference to the drawings.

1. Configuration

Figure 1:
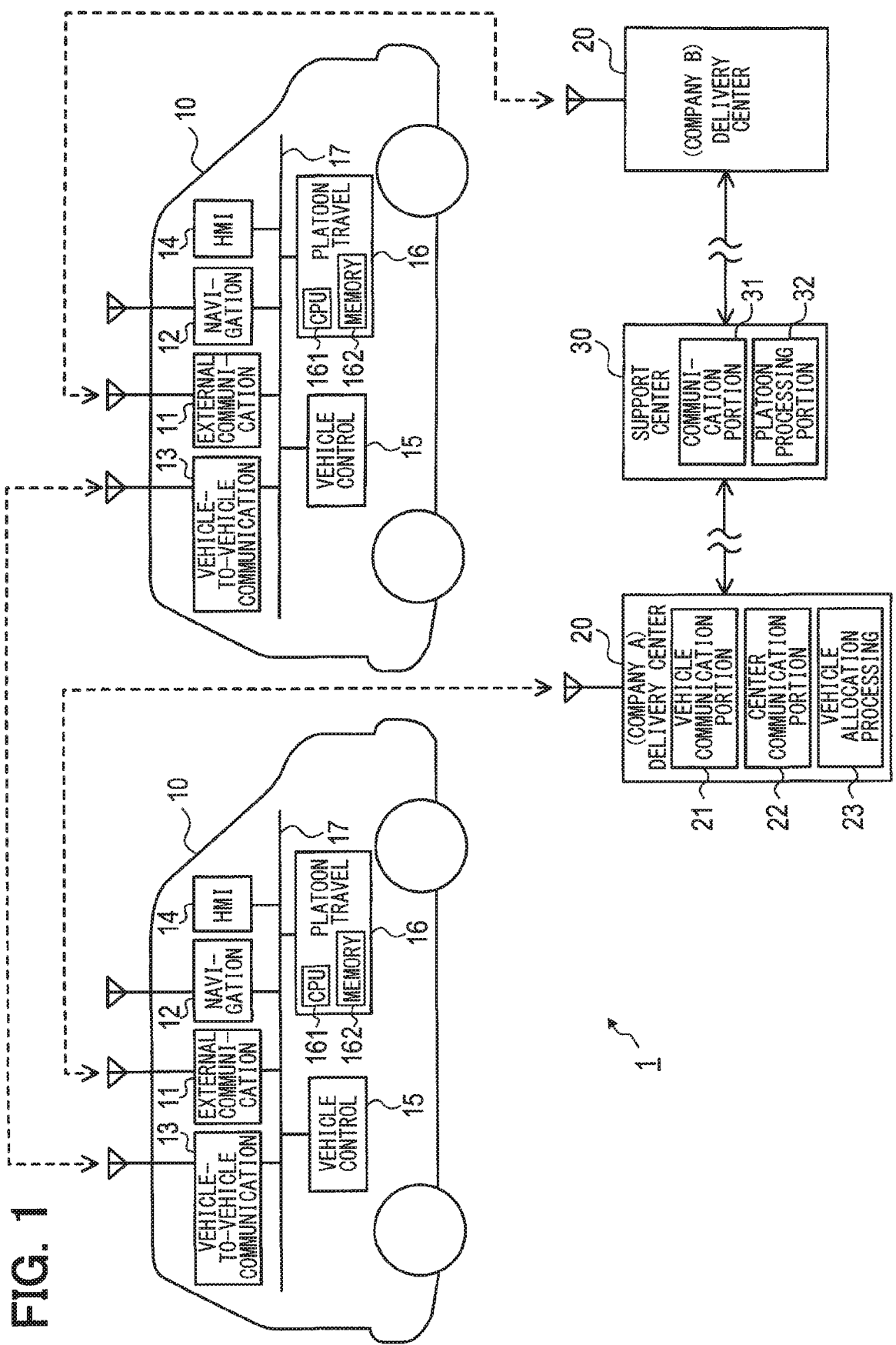
FIG. 1 is a block diagram showing a configuration of a platoon travel system.

As shown in FIG. 1, a platoon travel system 1 includes multiple vehicles 10, a delivery center 20 provided for each delivery company, and a support center 30 common to each of the delivery companies. Each of the vehicles participating in a platoon is provided by a commercial delivery truck. In addition, each of the multiple vehicles belongs to any one of the multiple delivery companies.

1-1. Vehicle

Each of the multiple vehicles 10 has an automated driving function. Each of the multiple vehicles 10 has the same configuration. Each of the multiple vehicles 10 includes an external communication portion 11, a navigation device 12, a vehicle-to-vehicle communication portion 13, a human machine interface (HMI) portion 14, a vehicle control portion 15, and a platoon travel portion 16. The external communication portion 11, the navigation device 12, the vehicle-to-vehicle communication portion 13, the HMI portion 14, the vehicle control portion 15, and the platoon travel portion 16 are connected to each other so as to communicate with each other via the vehicle network 17.

The external communication portion 11 wirelessly communicates with the delivery center 20 of the delivery company to which the subject vehicle belongs, and performs transmission and reception of various pieces of information related to the delivery. Specifically, the external communication portion 11 receives delivery information and platoon information from the delivery center 20. The delivery information relates to a delivery schedule. The platoon information relates to a platoon travel. The external communication portion 11 transmits a start notification, an end notification, and the like, each of which indicates an execution condition of the platoon travel to the delivery center 20 based on the platoon information. The external communication portion 11 may be configured using a communication device such as a mobile phone, a DSRC communication device, an ETC vehicle device or the like. The external communication portion 11 may be provided, but is not limited to, by the single above-described communication device. The external communication portion 11 may be provided by multiple types of communication devices in combination.

The navigation device 12 has a function of detecting a subject vehicle position or a traveling direction (that is, an orientation) of the subject vehicle using GPS or the like, a function of a route searching to a set destination, and a function of the guidance to the destination. These functions are well known.

The vehicle-to-vehicle communication portion 13 performs the transmission and reception of various pieces of information necessary for the platoon travel with another vehicle. The details of the configuration will be described later.

The HMI portion 14 has a display portion provided by an LCD or the like and an operation input portion provided by a touch panel or the like. The HMI portion 14 displays a necessary status related to the platoon travel, performs notification of start or finish of the platoon travel, and performs communication in the platoon. The function of the HMI section 14 may be integrated into the navigation device 12.

The vehicle control portion 15 detects a control operation amount and a traveling condition amount. The control operation amount is employed in a subject vehicle control such as a throttle opening degree, a steering angle, a brake operation amount, a gear position, or the like. The traveling condition amount represents the traveling condition of the subject vehicle such as a current position, velocity, acceleration, a yaw rate, the traveling direction, or the like. The vehicle control portion 15 provides the control operation amount and the traveling condition amount of the subject vehicle with another vehicle existing around the subject vehicle through the vehicle-to-vehicle communication portion 13 and acquires the control operation amount and the traveling condition amount of another vehicle. The vehicle control portion 15 performs the automated driving based on route information set in the navigation device 12, a target value (for example, a following distance, a following time, vehicle velocity, or the like) obtained from the platoon travel portion 16. In the automated driving, the engine, the brake, the steering, the transmission, or the like is automatically controlled based on the control operation amount and the traveling condition amount of the subject vehicle and another vehicle.

The platoon travel portion 16 includes a microcomputer having a CPU 161 and a semiconductor memory (hereinafter referred to as a memory 162) such as a RAM, a ROM, or a flash memory. Various functions of the platoon travel portion 16 are implemented by executing a program stored in a non-transitory tangible storage medium by the CPU 161. In this example, the memory 162 corresponds to a non-transitory tangible storage medium storing the program. In addition, by executing the program, a method corresponding to the program is executed. The platoon travel portion 16 may include one microcomputer or multiple microcomputers.

The platoon travel portion 16 executes a platoon execution processing, which will be described below, by executing the program by the CPU 161. In the platoon execution processing, the target value necessary for the platoon travel is set, and the target value is provided to the vehicle control portion 15. The vehicle control portion 15 executes automated driving based on the provided target value. As a result, the platoon travel is achieved.

1-2. Delivery Center

The delivery center 20 is provided for each of the delivery companies. The delivery center 20 includes a vehicle communication portion 21, a center communication portion 22, and a vehicle allocation processing portion 23. The vehicle communication portion 21 communicates with the vehicle 10 belonging to the subject delivery company (hereinafter, referred to as subject company vehicle). The center communication portion 22 communicates with the support center 30. The vehicle allocation processing portion 23 manages the delivery schedule or the like of the subject company vehicle 10.

The vehicle allocation processing portion 23 includes a microcomputer having a CPU and a memory, similarly to the platoon travel portion 16. The memory stores a program of processing executed by the CPU. In addition, the memory stores the delivery schedule of the subject company vehicle 10 and the fuel economy information indicative of the fuel economy of the subject company vehicle. The delivery schedule includes a delivery destination to be the destination, a travel route to the delivery destination, a scheduled arrival time at the delivery destination, and the like. Further, the delivery schedule includes a scheduled passage time of an interchange (hereinafter, referred to as IC) when a highway is included in the travel route. The support center 30 distributes the platoon information to the vehicle allocation processing portion 23 by the communication. The vehicle allocation processing portion 23 receives the platoon information through the center communication portion 22. In addition, in response to a request of one of the multiple vehicles 10, the vehicle allocation processing portion 23 executes information provision processing that provides the delivery schedule and platoon information related to the requesting vehicle by the communication through the vehicle communication portion 21.

1-3. Support Center

The support center 30 includes a communication portion 31 and a platoon processing portion 32. The communication portion 31 communicates with the delivery center 20 of each company. The platoon processing portion 32 generates various pieces of information related to the execution of the platoon travel based on the information acquired through the communication portion 31. The platoon processing portion 32 includes a microcomputer having a CPU and a memory, similarly to the platoon travel portion 16 and the vehicle allocation processing portion 23, which are described above. The platoon processing portion 32 communicates with each of the delivery centers 20 through the communication portion 31, and executes platoon information generation processing and charge processing, which will be described below.

The method for achieving each of functions of the platoon travel portion 16, the vehicle allocation processing portion 23, and the platoon processing portion 32 is not limited to software. For example, a part or all of the functions may be achieved using hardware combining logic circuits, analog circuits, or the like.

2. Processing

2-1. Platoon Information Generation Processing

Figure 3:
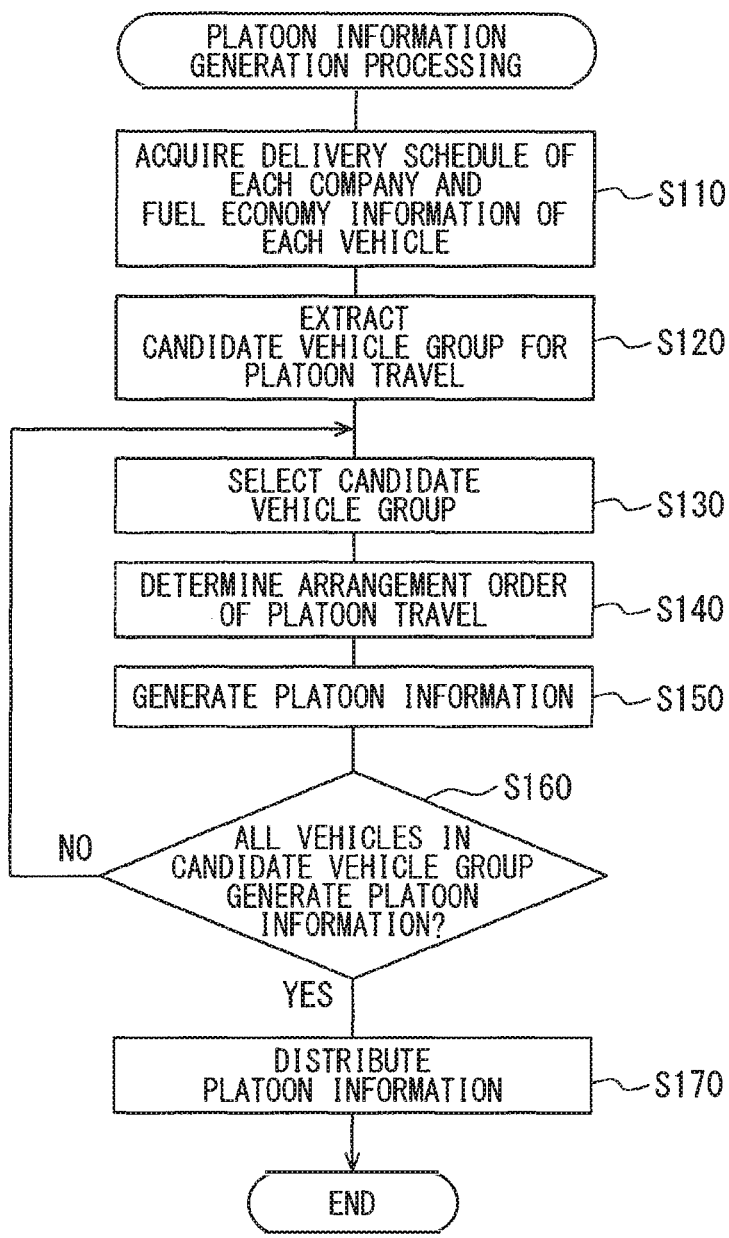
FIG. 3 is a flowchart showing a platoon information generation processing executed by the support center.

The platoon information generation processing executed by the platoon processing portion 32 of the support center 30 will be described with reference to the flowchart of FIG. 3. The platoon information generation processing is periodically activated at a predetermined cycle of time, for example, after the delivery schedule for tomorrow is determined at each of the delivery companies.

When the processing starts, in S110, the platoon processing portion 32 acquires the delivery schedule and the fuel economy information related to the delivery schedule from the delivery center 20 of each of the companies through the communication portion 31.

In S120, the platoon processing portion 32 refers to the acquired delivery schedules. When there are multiple vehicles that travel on the same highway in the same time period, the platoon processing portion 32 extracts the vehicles as a candidate vehicle group for the platoon travel.

In S130, the platoon processing portion 32 selects one candidate vehicle group from the extraction result in S120.

In S140, the platoon processing portion 32 determines an arrangement order of the multiple vehicles included in the candidate vehicle group selected in S130 for the platoon travel. The arrangement order is determined by the linear programming focusing on a fuel economy improvement effect for the entire platoon. The detail of the determination method will be described below.

In S150, the platoon processing portion 32 generates the platoon information. The platoon information includes a start point and a start scheduled time of the platoon travel, an end point and an end scheduled time of the platoon travel, the participant vehicles in the platoon travel, the arrangement order in the platoon travel, or the like.

In S160, the platoon processing portion 32 determines whether all the vehicles in the candidate vehicle group extracted in S120 have generated the platoon information. When the platoon processing portion 32 determines that a vehicle in the candidate vehicle group has not generated the platoon information, the process returns to S130 and repeats the same operations. When the platoon processing portion 32 determines that all the vehicles in the candidate vehicle group have generate the platoon information, the process proceeds to S170.

In S170, the platoon processing portion 32 distributes the generated platoon information to each of the delivery centers 20. Thereafter, the processing ends.

Figure 2:
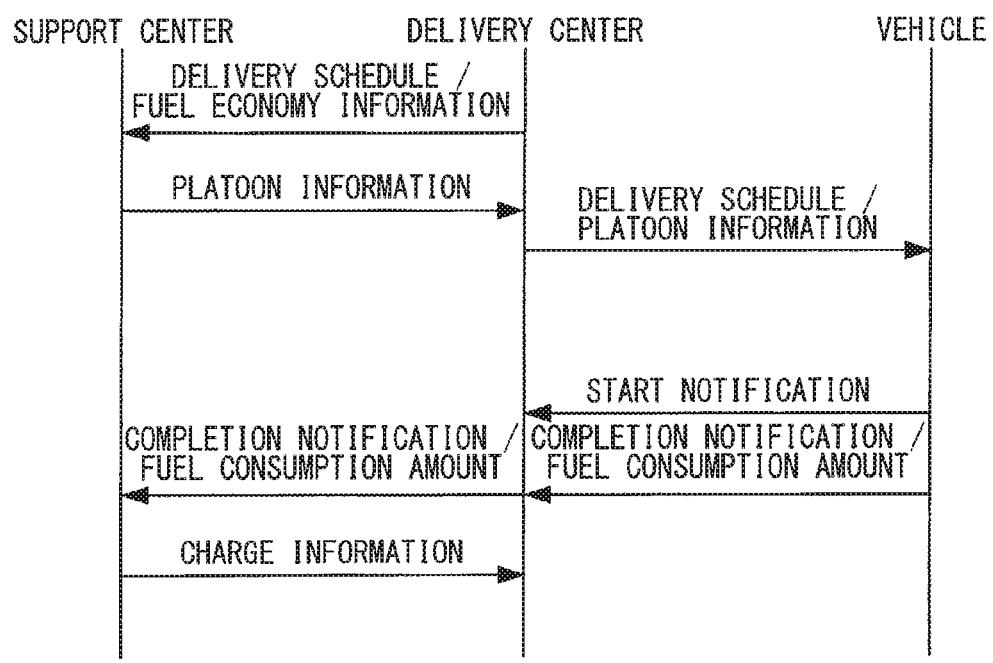
FIG. 2 is a sequence diagram schematically showing an outline of communication among a support center, a delivery center, and a vehicle, each of which configures the platoon travel system.

That is, as shown in FIG. 2, the support center 30 acquires the delivery schedule and the fuel economy information from each of the delivery centers 20, generates the platoon information based on the delivery schedule and the fuel economy information, and distributes the generated platoon information to the each of the delivery centers 20. Each of the delivery centers 20 stores the distributed platoon information. In response to a request from the vehicle 10, each of the delivery centers 20 provides the platoon information together with the delivery schedule to the vehicle 10 which executes the request.

2-2. Platoon Execution Processing

Figure 5:
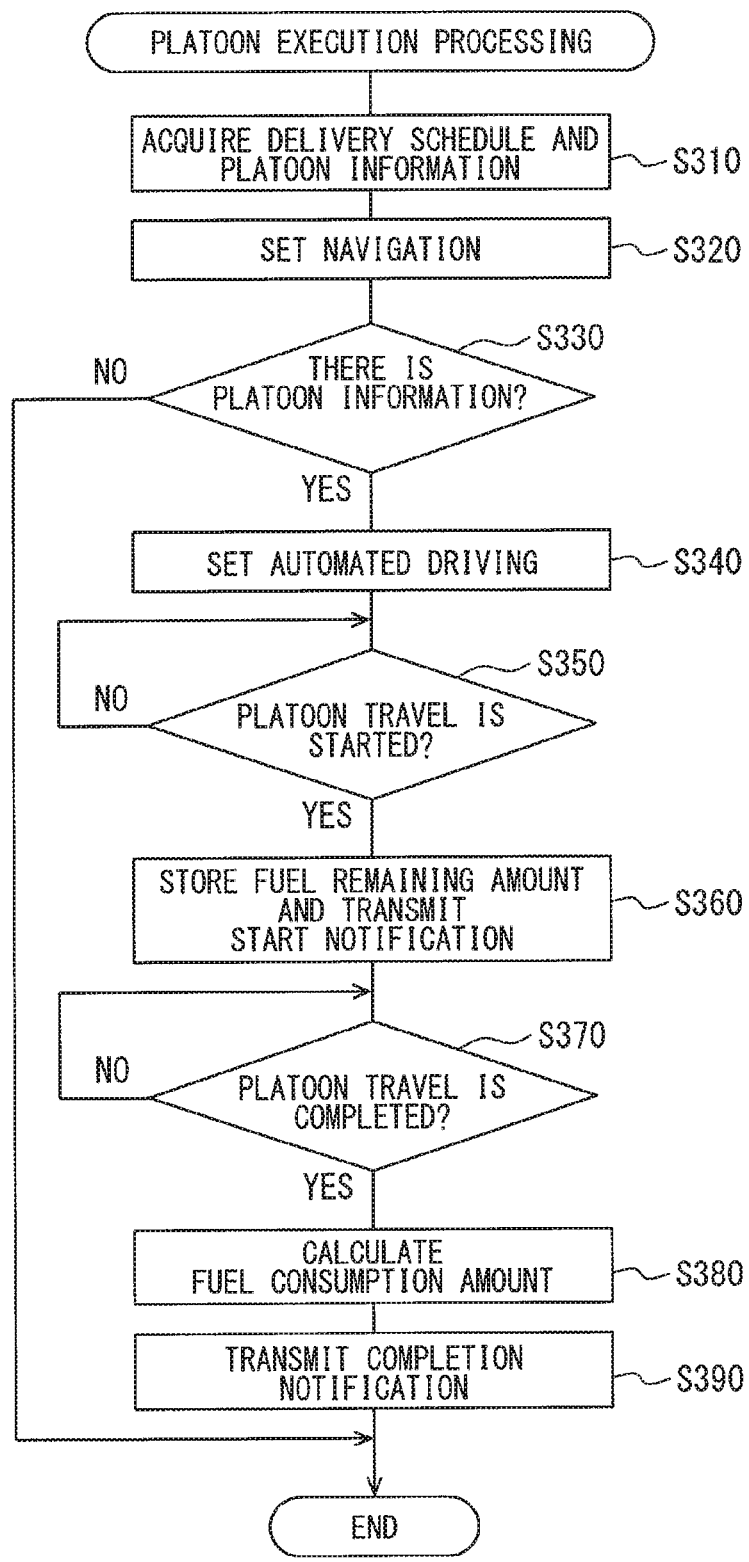
FIG. 5 is a flowchart showing a platoon execution processing executed by the platoon travel portion in the vehicle.

The platoon execution processing executed by the platoon travel portion 16 of the vehicle 10 will be described with reference to the flowchart of FIG. 5. The platoon execution processing starts when the power supply to the each portions of the vehicle 10 is turned on.

When the processing starts, in S310, the platoon travel portion 16 acquires the delivery schedule and the platoon information from the delivery center 20.

In S320, the platoon travel portion 16 sets the route included in the delivery schedule in the navigation device 12.

In S330, the platoon travel portion 16 determines whether there is the platoon information related to the subject vehicle. When the platoon travel portion 16 determines that there is no platoon information related to the subject vehicle, the processing ends. When the platoon travel portion 16 determines that there is the platoon information related to the subject vehicle, the procedure proceeds to S340.

In S340, based on the platoon information, the platoon travel portion 16 sets the information such as, a section in which the platoon travel is executed, or the like in the navigation device 12.

In S350, the platoon travel portion 16 determines whether the platoon travel has been started based on the information obtained from navigation device 12, the vehicle-to-vehicle communication portion 13, the vehicle control portion 15, or the like. When the platoon travel portion 16 determines that the platoon travel has not been started, the procedure waits until the platoon travel portion 16 determines that the platoon travel has been started. When the platoon travel has been started, the procedure proceeds to S360.

In S360, the platoon travel portion 16 detects a start point remaining amount, which is a remaining amount of the fuel at a start point of the platoon travel, from a fuel sensor which is not shown in drawings through the vehicle network 17, and stores the start point remaining amount. In addition, the platoon travel portion 16 transmits start notification indicative of the start of the platoon travel to the delivery center 20 of the company to which the subject vehicle belongs through the external communication portion 11.

In S370, the platoon travel portion 16 determines whether the platoon travel has been completed based on the information obtained from navigation device 12, the vehicle-to-vehicle communication portion 13, the vehicle control portion 15, or the like. When the platoon travel portion 16 determines that the platoon travel has not been completed, the procedure waits until the platoon travel portion 16 determines that the platoon travel has been completed. When the platoon travel has been completed, the procedure proceeds to S380.

In S380, the platoon travel portion 16 detects an end point remaining amount, which is a remaining amount of the fuel at an end point of the platoon travel, from the above-described fuel sensor through the vehicle network 17. Further, the platoon travel portion 16 calculates a fuel consumption amount for the platoon travel by subtracting the detected end point remaining amount from the start point remaining amount stored in S360.

In S390, the platoon travel portion 16 transmits a completion notification indicative of the completion of the platoon travel and the fuel consumption amount calculated in S380 to the delivery center 20 of the company to which the subject vehicle belongs through the external communication portion 11. Thereafter, the processing ends.

That is, as shown in FIG. 2, the vehicle 10 acquires the delivery schedule and the platoon information from the delivery center 20 of the company to which the subject vehicle belongs. When the vehicle 10 starts the platoon travel based on the acquired platoon information, the vehicle 10 transmits the start notification to the delivery center 20. When the vehicle 10 completes the platoon travel, the vehicle 10 transmits the fuel consumption amount and the completion notification to the delivery center 20. The delivery center 20 transfers the completion notification and the fuel consumption amount received from the vehicle to the support center 30.

2-3. Charge Processing

Figure 4:
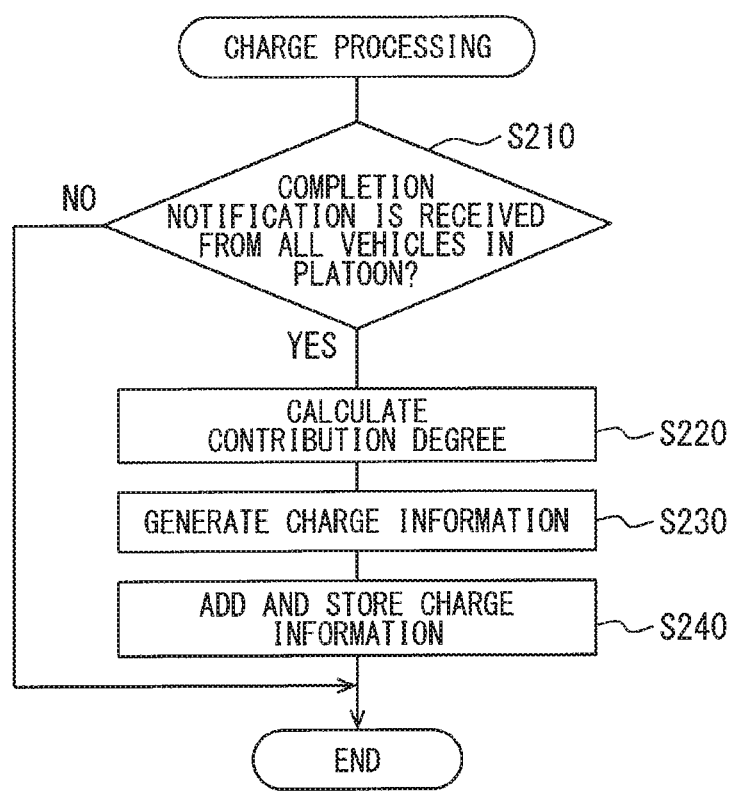
FIG. 4 is a flowchart showing a charge processing executed by the support center.

The charge processing executed by the platoon processing portion 32 of the support center 30 will be described with reference to the flowchart of FIG. 4. The charge processing starts each time the platoon processing portion 32 receives the completion notification through the communication portion 31.

When the processing starts, in S210, the platoon processing portion 32 determines whether the completion notification has been received from the subject vehicle and all the vehicles which participate in the platoon travel (hereinafter, referred to as the participant vehicles). When the platoon processing portion 32 determines that there is a vehicle from which the completion notification has not been received, the processing temporarily ends. When the platoon processing portion 32 determines that the completion notification has been received from all the vehicles, the procedure proceeds to S220.

In S220, the platoon processing portion 32 calculates a contribution degree of each of the participant vehicles to the fuel economy improvement effect of the entire platoon by calculating a Shapley value. The contribution degree is calculated using the fuel economy information related to the participant vehicles, a travel distance for the platoon travel, and a fuel economy improvement coefficient. The fuel economy improvement coefficient is determined based on the arrangement order in the platoon. The detail of the calculation method for the contribution degree will be described later.

In S230, the platoon processing portion 32 generates charge information for the each of the vehicles based on the calculated contribution degree. The detail of the generation method for the contribution degree will be described later.

In S240, the platoon processing portion 32 adds the calculated charge information by each of the delivery companies and stores the totaled charge information by each of the delivery companies. Thereafter, the processing ends.

That is, as shown in FIG. 2, the support center 30 generates the charge information based on the completion notification and adds the charge information. The totaled charge information is transmitted at a predetermined cycle (for example, once a month) to each of the delivery companies, a financial institution performing liquidation, or the like.

3. Operation Example

The determination method of the arrangement order in the platoon travel executed in S140, the calculation method for the contribution degree executed in S220, and the generation method of the charge information executed in S230 will be described with a specific example.

3-1. Arrangement Order Determination

Here, as shown in Table 1, the following condition is assumed.

Three vehicles (for example, trucks) A, B, and C take the highway at an interchange (hereinafter, referred to as IC) at the same time, and performs the platoon travel to the IC closest to a destination for a planned distance (for example, 500 kilometers).

The fuel economy improvement coefficient indicative of the fuel economy improvement effect for each of the vehicles in the platoon travel is determined by a distance between vehicles and a position in the platoon travel. A fuel economy when a vehicle travels alone is defined as a fuel economy S. A fuel economy when a vehicle participates in the platoon travel is defined as a fuel economy T. In this case, the fuel economy improvement coefficient is calculated as (S−T)/S. For example, when the distance between the vehicles is 4 meters, the fuel economy improvement coefficient for a leading vehicle, a tail vehicle, and an intermediate vehicle is calculated as 0.08, 0.15, and 0.2, respectively. The fuel economy improvement coefficient is given as known information. Also, the fuel price is defined as 100 yen per liter.

TABLE 1

| TRAVEL DISTANCE [km] | FUEL ECONOMY IMPROVEMENT COEFFICIENT | | | FUEL PRICE [¥/l] |
|---|---|---|---|---|
| | LEADING | INTER-MEDIATE | TAIL | |
| 500 | 0.08 | 0.2 | 0.15 | 100 |

Under the above-described conditions, there is the platoon formation, that is, the arrangement order of the vehicles A, B, and C, which has the highest fuel economy improvement effect for the entire platoon. The optimal arrangement order will be calculated by the linear programming. Specifically, an expected reduction amount is calculated for each of the vehicles A, B, and C. Based on the fuel economy of each of the vehicles and the fuel economy improvement coefficient corresponding to the position in the platoon, the expected reduction amount is a value expected when each of the vehicles travels in the position in the platoon for a scheduled distance. Table 2 shows the result of the calculation of the expected reduction amount. The fuel economy is assumed to be 10 [km/l] for the vehicle A, 8 [km/l] for the vehicle B, and 4 [km/l] for the vehicle C.

TABLE 2

| VE-HICLE | FUEL ECON-OMY [km/l] | FUEL CONSUMP-TION [l] | EXPECTED REDUCTION AMOUNT[l] | | |
|---|---|---|---|---|---|
| | | | LEADING | INTER-MEDIATE | TAIL |
| A(2t) | 10 | 50 | 4 | 10 | 7.5 |
| B(4t) | 8 | 62.5 | 5 | 12.5 | 9.375 |
| C(10t) | 4 | 125 | 10 | 25 | 18.75 |

A total reduction amount is calculated for all patterns of the arrangement order when each of the vehicles A, B, and C travels alone, when two of the vehicles A, B, and C perform the platoon travel, and when three of the vehicles A, B, and C perform the platoon travel. The total reduction amount is a total value for the expected reduction amount of each of the vehicles participating in the platoon travel. Table 3 shows the result of the calculation for the total reduction amount.

TABLE 3

| PLATOON | TOTAL REDUCTION AMOUNT [l] | |
|---|---|---|
| | CALCULTED VALUE | REPRESENTATIVE VALUE |
| A | 0 | 0 |
| B | 0 | 0 |
| C | 0 | 0 |
| AB | 13.375 | 13.375 |
| BA | 12.5 | |
| AC | 22.75 | 22.75 |
| CA | 17.5 | |
| BC | 23.75 | 23.75 |
| CB | 19.375 | |
| ABC | 35.25 | 38.375 |
| ACB | 38.375 | |
| BAC | 33.75 | |
| BCA | 37.5 | |
| CAB | 29.375 | |
| CBA | 30 | |

As shown in Table 3, the total reduction amount is maximized when the arrangement order is "vehicle A, vehicle C, vehicle B". This order is determined as the arrangement order of the platoon travel.

3-2. Contribution Degree Calculation

As shown in Table 3, for the calculation of the contribution degree, a representative value of the total reduction amount is set for each combination of the vehicles. The combination of the vehicles employed in the calculation indicates the platoons that differ in the arrangement orders and the platoons formed by the same vehicles. The representative value of the total reduction amount indicates the maximum value of the total reduction amount among the total reduction amounts which belong to a target combination. In other words, the representative value of the total reduction amount is 0 [l] when the vehicles A, B, and C do not form the platoon, 13.375 [l] when the vehicles A and B form the platoon, 22.75 [l] when the vehicles A and C form the platoon, 23.75 [l] when the vehicles B and C form the platoon, and 38.375 [l] when the vehicles A, B, and C form the platoon.

The vehicles participate in the platoon to the leading position, the intermediate position, and the tail position in the described order. The contribution degree of each vehicle is calculated for all of the arrangement order patterns when the three vehicles perform the platoon travel. The calculation result of the contribution degree for each vehicle is shown in Table 4.

TABLE 4

| PLATOON | CONTRIBUTION DEGREE[l] | | |
|---|---|---|---|
| | A | B | C |
| ABC | 0 | 13.375 | 25 |
| ACB | 0 | 15.625 | 22.75 |
| BAC | 13.375 | 0 | 25 |
| BCA | 14.625 | 0 | 23.75 |
| CAB | 22.75 | 15.625 | 0 |
| CBA | 14.625 | 23.75 | 0 |
| CONTRIBUTION REDUCTION AMOUNT [l] (SHAPLEY VALUE) | 10.89583 | 11.39583 | 16.08333 |

For example, the case where the arrangement order is "vehicle A, vehicle B, vehicle C" will be described. First, the vehicle A joins the platoon. The representative value 0 [l] of the total reduction amount for the platoon A in Table 3 is the contribution degree of the vehicle A in the arrangement order. Next, the vehicle B joins the platoon. The contribution degree of the vehicle B in the arrangement order is calculated by subtracting the contribution degree 0 [l], which is the benefit of the vehicle A when the vehicle B does not join the platoon, from the representative value 13.375 [l] of the total reduction amount for the platoon AB in Table 3. That is, the contribution degree of the vehicle B becomes 13.375 [l]. Further, the vehicle C joins the platoon. The contribution degree of the vehicle C in the arrangement order is calculated by subtracting the contribution degree 13.375 [l], which is the benefit of the vehicle B when the vehicle C does not join the platoon, from the representative value 38.375 [l] of the total reduction amount for the platoon ABC in Table 3. That is, the contribution degree of the vehicle C becomes 25 [l].

The Shapley value, which is the expected value of the contribution degree, for each of the vehicles is calculated based on the contribution degrees calculated for all the arrangement order. The Shapley value is referred to as a contribution reduction amount indicative of the contribution degree for each of the vehicles.

3-3. Charge

In the calculation of the charge amount, a loss-gain amount of each vehicle is calculated. Specifically, as shown in Table 5, the expected reduction amount for each of the vehicles in the arrangement order is calculated from Table 2 according to the predetermined arrangement order for the platoon travel of "vehicle A, vehicle C, vehicle B". Next, the loss-gain amount for each of the vehicles is calculated by subtracting the contribution reduction amount (that is, the Shapley value) obtained by the Table 4 from the calculated expected reduction amount. When the loss-gain amount is positive, the benefit obtained by the subject vehicle, that is, the expected reduction amount of the subject vehicle is great compared with the contribution degree of the subject vehicle. On the other hand, when the loss-gain amount is negative, the benefit obtained by the subject vehicle is small compared with the contribution degree of the subject vehicle. The charge amount is defined as the result of multiplying the loss-gain amount by the fuel price per liter. That is, the positive charge amount indicates expenditure, and the negative charge amount indicates an income.

TABLE 5

| PLATOON ACB | A | B | C |
|---|---|---|---|
| EXPECTED REDUCTION AMOUNT [l] (OR ACTUAL REDUCTION AMOUNT) | 4 | 9.375 | 25 |
| LOEE-GAIN AMOUNT [l] | −6.89583 | −2.02083 | 8.916667 |
| CHARGE AMOUNT[¥] | −698.583 | −202.3083 | 891.6667 |

4. Effects

According to the present embodiment described above, the following effects can be obtained.

The configuration calculates the contribution degree of each vehicle for the fuel economy improvement effect in the entire platoon based on the Shapley value. The configuration charges each of the vehicles or the delivery company to which each of the vehicles belongs for the difference between the expected fuel economy improvement effect and the contribution degree. Thus, regardless of the arrangement order of the vehicles participating in the platoon travel, the configuration can fairly distribute the benefit for the participation in the platoon travel among the vehicles. As a result, the configuration can set the arrangement order that maximizes the entire benefit without giving a feeling of unfairness. Further, the configuration can motivate the delivery companies or the drivers to participate in the platoon travel.

5. Other Embodiments

Although the embodiment of the present disclosure has been described above, the present disclosure is not limited to the above-described embodiments, and various modifications can be made.

(5a) In the above-described embodiment, the expected reduction amount of each vehicle obtained from Table 2 is employed for generating the charge information, but the present disclosure is not limited thereto. For example, instead of the expected reduction amount, an actual reduction amount calculated from the fuel consumption amount included in the completion notification may be employed.

(5b) In the above-described embodiment, the delivery center 20 and the support center 30 are separately provided, but the present disclosure is not limited thereto. For example, a common delivery center having a function that integrates the delivery center 20 and the support center 30 may be provided in each of the delivery companies.

(5c) In the above-described embodiment, the fuel economy is employed as the vehicle characteristic for the determination of the arrangement order of the vehicles in the platoon travel. In the above-described embodiment, the fuel reduction amount is employed as the loss-gain information for the calculation of the contribution degree of each vehicle in the platoon travel. The present disclosure is not limited thereto. As the gain information, any index can be employed on a condition that the loss-gain for the each of the vehicles participating in the platoon travel can be quantified.

(5d) In the above-described embodiment, the vehicles participating in the platoon travel is assumed to be gas vehicles, but the present disclosure is not limited thereto. For example, the vehicle may be a diesel vehicle or an electric vehicle. When an electric vehicle is employed, electricity cost may be used instead of fuel economy.

(5e) A plurality of functions of one element in the above embodiment may be implemented by a plurality of elements or one function of one element may be implemented by a plurality of elements. A plurality of functions of a plurality of elements may be implemented by one element, or one function implemented by a plurality of elements may be implemented by one element. A part of the configuration of the above embodiment may be omitted. At least a part of the configuration of the above embodiment may be added to or replaced with another configuration of the above embodiment. All modes included in the technical idea identified by the wording described in the claims correspond to embodiments of the present disclosure.

(5f) In addition to the above-described platoon travel system, the present disclosure may be adopted to various forms such as a program for causing the computer to function as a device for achieving functions included in the platoon travel system, a non-transitory tangible storage medium such as a semiconductor memory for storing the program, a method for charging in the platoon travel.

The invention claimed is:

1. A platoon travel system that causes a plurality of vehicles to perform a platoon travel, each of the plurality of vehicles has an automated driving function, and the platoon travel system comprising a processor, the processor is configured to:
acquire a travel schedule of each of the plurality of vehicles and extract a plurality of target vehicles, which are to perform the platoon travel, from the plurality of vehicles;
determine an arrangement order of the plurality of target vehicles in the platoon travel using a linear programming based on characteristic information indicative of a characteristic for each of the plurality of target vehicles;
notify the plurality of target vehicles of platoon information that includes at least the arrangement order;
calculate a contribution degree for each of the plurality of target vehicles using loss-gain information, the contribution degree being calculated with respect to a benefit of all of the plurality of target vehicles obtained by performing the platoon travel, and the loss-gain information reflecting the benefit obtained when the plurality of target vehicles participate in the platoon travel; and
determine a charge amount for each of the plurality of target vehicles based on the contribution degree when the platoon travel is performed based on the platoon information, and the charge amount being determined for each of the plurality of target vehicles to fairly obtain an advantage.

2. The platoon travel system according to claim 1, wherein:
the processor is further configured to determine the arrangement order based on a fuel economy of each of the plurality of target vehicles and a fuel economy improvement rate preliminary set in the arrangement order;
the fuel economy is employed as the characteristic information; and
the arrangement order is determined for maximizing a sum of an expected reduction amount that is an expected value of a fuel reduction amount for each of the plurality of target vehicles.

3. The platoon travel system according to claim 2, wherein
the fuel reduction amount obtained when the plurality of target vehicles participate in the platoon travel is employed as the loss-gain information.

4. The platoon travel system according to claim 3, wherein
the processor is further configured to determine the charge amount based on a difference between a contribution reduction amount, which is defined as the fuel reduction amount corresponding to the contribution degree, and the expected reduction amount.

5. The platoon travel system according to claim 3, the processor is further configured to:
acquire an actual reduction amount, which is the fuel reduction amount actually measured during the platoon travel, from each of the plurality of target vehicles when the platoon travel based on the platoon information is completed; and
determine the charge amount based on a difference between a contribution reduction amount, which is defined as the fuel reduction amount corresponding to the contribution degree, and the actual reduction amount.

6. The platoon travel system according to claim 1, wherein
the processor is further configured to calculate a Shapley value as the contribution degree.

7. The platoon travel system according to claim 1, wherein
the processor is provided by at least one of a hardware circuit, a central processing unit along with a memory, and a combination of the hardware circuit and the central processing unit.

8. A platoon travel system that causes a plurality of vehicles to perform a platoon travel, each of the plurality of vehicles has an automated driving function, and the platoon travel system comprising:
an extraction portion configured to acquire a travel schedule of each of the plurality of vehicles and extract a plurality of target vehicles, which are to perform the platoon travel, from the plurality of vehicles;
an arrangement order determination portion configured to determine an arrangement order of the plurality of target vehicles in the platoon travel using a linear programming based on characteristic information indicative of a characteristic for each of the plurality of target vehicles, which is extracted by the extraction portion;
a schedule notification portion configured to notify the plurality of target vehicles, which is extracted by the extraction portion, of platoon information that includes at least the arrangement order, which is determined by the arrangement order determination portion;
a contribution degree calculation portion configured to calculate a contribution degree for each of the plurality of target vehicles using loss-gain information, the contribution degree being calculated with respect to a benefit of all of the plurality of target vehicles obtained by performing the platoon travel, and the loss-gain information reflecting the benefit obtained when the plurality of target vehicles participate in the platoon travel; and
a charge portion configured to determine a charge amount for each of the plurality of target vehicles based on the contribution degree calculated by the contribution degree calculation portion when the platoon travel is performed based on the platoon information, and the charge amount being determined for each of the plurality of target vehicles to fairly obtain an advantage.

* * * * *